March 10, 1964 E. D. MILLER, JR 3,123,886
ASSEMBLY FOR FORMING REFRACTORY TUBES
Filed Aug. 21, 1961
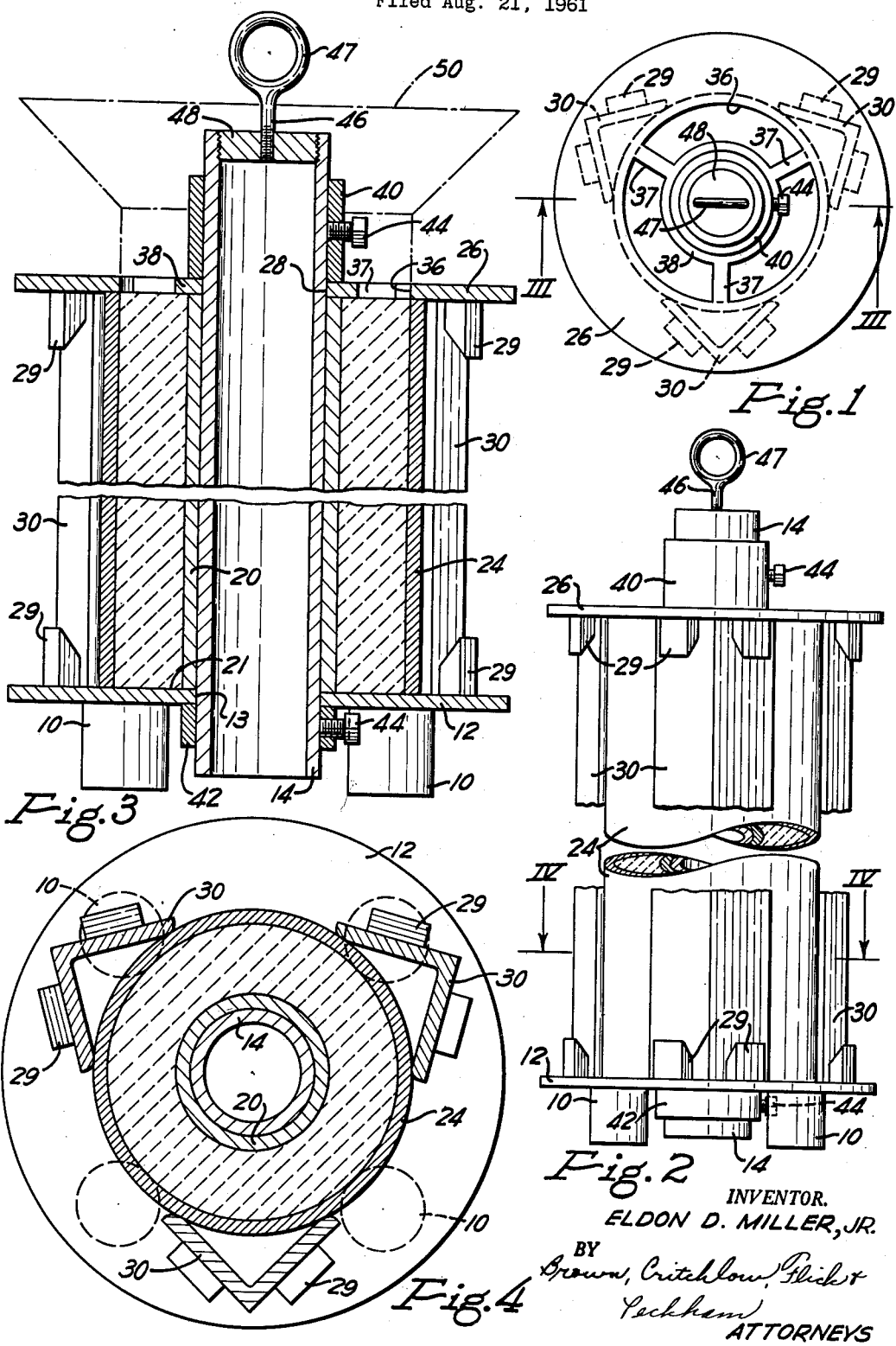
INVENTOR.
ELDON D. MILLER, JR.
BY Brown, Critchlow, Flick &
Peckham
ATTORNEYS

United States Patent Office 3,123,886
Patented Mar. 10, 1964

3,123,886
ASSEMBLY FOR FORMING REFRACTORY TUBES
Eldon D. Miller, Jr., Bethel Park, Pa., assignor to Harbison-Walker Refractories Company, Pittsburgh, Pa., a corporation of Pennsylvania
Filed Aug. 21, 1961, Ser. No. 132,789
2 Claims. (Cl. 25—126)

This invention relates to the preparation of refractory articles and, in particular, it concerns novel apparatus for forming articles such as refractory tubes.

Refractory tubes are used for many applications in industry. In certain applications, the specifications for such tubes are particularly rigid, and are on the order that might be expected only in preparing machined metal articles or the like. For example, a refractory tube is utilized in the bottom feed casting process that has been adopted in the railway car wheel field. Tubes for that purpose, and which can be six feet or more in length, must withstand the heat and corrosive action of molten metal and slag passing over its surfaces at substantial speeds and turbulence. Nevertheless, it is essential that the bore of the tube vary less than about ¼ inch over its entire length. Smaller tubes of similarly rigid specifications are made and used for other processes.

A common manner of making such refractory tubes is to ram or tamp a tempered refractory batch in a mold made of steel or similar material. Thereafter, the mold is removed and the tube is dried and fired. For a long tube, it is obvious that a high degree of labor is required in the foregoing process. Accordingly, costs are high and product uniformity is adversely affected. The rate of making tubes in that manner is quite slow, for most steps require substantial labor; for example, the mold is rigid and must be very carefully, and therefore very slowly, removed to avoid destroying the tube. A still greater problem is the difficulty of obtaining uniform charging of material and uniform packing of refractory particles by the ramming method. Frequently the graded sizes will separate and segregate while being charged to the long tubular mold.

Another method of forming such tubes is by extrusion. Here the basic problem is lamination which is almost insurmountable due to the tendency of the material to flow faster in the middle of the extrusion. Also where a large tube is prepared, substantial difficulty is experienced in maintaining rigid specifications. For example, the weight of the tube alone can cause it to warp merely upon standing out of plumb.

It is, therefore, the primary object of the present invention to provide an assembly for the production of refractory articles such as tubes, especially with large overall dimensions, which is simple and easily constructed and used, and can be used with a minimum of labor, and which results in articles such as tubes of uniformity and freedom from structural flaws that have heretofore been characteristic of products produced in this field.

These and other objects are attained in accordance with the present invention in which the refractory tubes are prepared by ceramic forming in a tube assembly hereinafter described. In this invention, a batch of refractory materials for the composition desired is prepared. The tube is formed from the batch in a mold lined with a particular fluid absorbent material. Thereafter, the formed tube is dried, the liner of the mold is removed in a manner characteristic of the present invention, and the resulting dried and strong tube, free from its mold liner and the remainder of the assembly, is fired to obtain the final product. In this general manner, the following advantages results: no strains are introduced into the tube as a consequence of removing the mold while the tube is wet; the bore and the sidewall thickness of the tube are characteristically uniform rather than uneven as heretofore; upon removal from the mold liner, warping does not occur because strength has been developed in the tube by drying that is accomplished prior to removal of the rigidly held mold liner and assembly; in view of the manner of removing the mold liner, tube-staining from fluxes that form upon fusion of the ash from the liner materials is not encountered. There result good tubes at a high rate of production and at moderate cost per unit.

The invention will be further described in conjunction with the attached drawings in which:

FIG. 1 is a top plan view of a mold assembly of the present invention;

FIG. 2 is a side elevation of the tube mold assembly of FIG. 1;

FIG. 3 is a sectional view of the mold assembly taken along line III—III of FIG. 1; and FIG. 4 is a sectional view of the lower portion of a mold assembly taken along lines IV—IV of FIG. 2.

Referring now to the drawings, the mold assembly is supported on legs (see FIGS. 2 and 3) that may, but need not, be integral with a bottom plate 12. Other means of support can be used as well. The bottom plate 12 has a central bore 13 through it that snugly receives a metal cylinder 14, such as a pipe or the like. Metal cylinder 14 is preferably of a length substantially greater than that of the refractory tube to be formed so that portions of the cylinder can extend beyond the ends of the refractory tube, for reasons hereinafter developed.

Centrally about the metal cylinder 14 is a mold liner tube 20 that slip-fits over cylinder 14 so that little or no play exists. The exposed surface of the mold liner tube 20 thereby constitutes the effective central wall of the mold assembly. The mold liner tube 20 is supported at its lower end on the upper surface 21 of bottom plate 12 adjacent bore 13. The liner length as well as the length of the outer mold liner hereinafter described, determine the length of the tube being produced. Generally, the effective mold length is that which is great enough to permit shrinkage and cutting and trimming of the tube ends to adapt the resulting product to a particular application.

A second mold liner tube 24 is provided as the outer mold liner for the refractory tube being produced. At its bottom surface, liner 24 is supported on the bottom plate 12.

Mold liners 20 and 24 are retained in position relative to the bottom plate 12 by a top plate 26 resting on those liners and which has a central bore 28 that snugly receives the metal cylinder 14. To insure concentric disposition of tube 24 with respect to tube 20 each time the assembly is put together for use, the top and bottom plates 26 and 12, respectively, have flanges or clips 29 welded, or otherwise attached, to these plates. These clips, in turn, receive rigid angle members 30 of a length essentially the same as that of tubes 20 and 24. Experience has shown that about three of angle members 30 are adequate to provide support to tube 24 even at a tube length on the order of seven feet. Support members are needed on any size tube at points that are a maximum of about 120° apart to obtain rigidity. For small diameter tubes, greater spacing could possibly be tolerated, but that would not be sound practice for long tubes of larger diameter. The angle members 30 shown are 90° members that are smoothed at their ends so that no destruction of liner 24 occurs. Obviously, other rigid supports, such as arc-shaped members, should be used as well. It will be evident to those skilled in the art that other means providing similar support can be used as well.

The refractory batch enters the resulting mold through the top plate 26. For that purpose, top plate 26 has an annular opening 36 through it, the outside diameter of opening 36 being substantially equal to the inside diameter of the mold liner 24. Preferably, the annular opening 36 is composed of several annular segments so that portions 37 of the plate 26 remain to support the resulting annular ring 38 of plate 26 about its central bore 28.

End plates 12 and 26 are maintained in position at the opposite ends of the mold liners and relative to the cylindrical member 14, in the embodiment shown, by top and bottom retaining collars 40 and 42, respectively. Each collar is provided with a set screw 44 or is otherwise adapted so that it can be fixed relative to the cylinder 14 and yet be readily removed for disassembly. Other means could be used for this purpose. For example, the central tube 14 could be threaded and screwed into plates 12 and 26. A keying arrangement could be used. Pins extending through the tube also might be used.

A mold assembly as just described is of substantial weight, whether filled or empty, and moving it by mechanical means is desirable. Accordingly, there is provided a lifting means, such as a rod 46 having a terminal eye 47, and the rod is attached to the upper end of metal cylinder 14. As shown in the drawing, this is accomplished by attaching the rod 46 to the tube by means of a screw member 48; it should be understood that use of a pin or other means of attachment can be used if desired.

One of the particular advantages of the mold assembly described is its ease of assembly and disassembly, and the fact that the desired mold of specified dimensions is produced essentially automatically and independently of the skill of the mold assembler. These factors are brought about largely because the central bores 13 and 28 in the bottom and top plates, respectively, and the retaining clips 29 can be accurately located on these plates during manufacture and need not be adjusted or removed. Concentricity of the two mold liners is thereby assured. It is apparent that the use of such means as the retaining collars, the end plates, the angle supporting members and the central metal cylinder, the latter acting as a mandrel for the tube being prepared, permits reuse of material portions of the mold assembly for as many times as desired.

In the preparation of a refractory tube with the mold assembly just described, the assembly preferably is vibrated. A charging funnel 50 (dotted lines in FIG. 3) having an annular feeding spout that fits the annular opening 36 in top plate 26 is placed over the metal mandrel 14 and directly on the top plate member 26. A batch of the refractory material enters the mold through this funnel. Depending on the mix used, additional vibrating means can be attached to the funnel, and mixing means can be located within the funnel itself or in the batch to insure uniform flow of the mix.

One of the vitalizing features of this invention is the use of particular materials as mold liners. In accordance with the present invention, this mold liner material, specifically that of tubes 20 and 24 in the assembly described, must have certain characteristics. It must be a fluid absorbent material. Ceramic forming in this invention utilizes a refractory batch containing water on the order of 4 to 10 weight percent based on the weight of the batch. Some of the water must be removed and the tube dried while the tube is fully supported, for otherwise cracks, warping and the like will develop due to the lack of strength in the wet structure. Plaster of Paris has served to absorb this water heretofore, but such material cannot be used in the present invention. However, the liner material should have a fluid absorbency and a porosity at least on the order of plaster of Paris molds. The mold liner material must be further characterized by having a char point above the temperature at which the cast tube is dried but below the fusion point of fluxes from the liner material or formed upon reaction of components of the liner material and the refractory tube. As a general rule, this char point falls within the range of about 300° or 350° F. to about 1500° to 1800° F. The term "char point" is intended to indicate the point at which combustion, decomposition or other phenomenon occurs whereby the liner material is effectively destroyed, being converted to an ash that falls away from the refractory tube, without glass fusion occurring. The material presently preferred for this purpose is commercial cardboard of about one-quarter inch thick. Chipboard, papier mache or similar material could be used as well. The char point of such cardboards is about 450° F.

The apparatus of the invention can be used with any refractory batch. The chemical composition depends on the intended use. For example, for refractory tubes used in casting car wheels, stabilized high alumina material such, for example, as calcined bauxite or diaspore is frequently a basic constituent. Other structures are made with chrome ore, dead burned magnesite or the like with or without small amounts of clay plasticizers. The fluid used to form the slip is generally the minimum possible, that is about 4 percent, though as much as 10 percent is used on occasion. The batch is conventionally prepared by mixing in any of several commercially available mixers, for example a muller type pan mixer.

The invention will be further described by way of the following specific example in which the details are given by way of illustration and not by way of limitation.

A refractory tube of about 6 feet in length was to be made. The mold liner materials used were commercial cardboard tubes having a wall thickness of about ¼ inch. The center mold liner tube had an outside diameter of 3½ inches and the outside mold liner had an inside diameter of 6½ inches. Thus, the dimensions of the tube to be produced were defined.

A refractory batch was prepared as follows: Ball clay in an amount of 15 percent, 4 percent of water, 0.2 percent of a commercial dispersing agent, and the remainder to 100 percent, of calcined South American bauxite, sized as shown below, were mixed in a muller type mixer for about 10 minutes.

| Mesh: | Percent |
|---|---|
| +10 | 32 |
| −10+28 | 20 |
| −28+65 | 8 |
| −65+150 | 5 |
| −150 | 35 |

The resulting batch was then fed into the annular form defined by the concentric mold liner tubes just stated in the assembly described hereinbefore. During the mold filling, the mold assembly was vibrated by vibrating the table on which it was supported, and a mixing rod was used in the batch as it was fed through the funnel into the mold assembly. After the tube was completely filled, the mold assembly was placed in a drier. It was maintained in the drier for about 10 hours at 230° F. This served to remove enough of the water to harden or set the refractory tube while retaining the mold liners intact.

Therefore, its temperature was raised to 500° F. and maintained there for about one hour. The assembly was then removed from the drier and it was found that the mold liners had been converted to an ash. It had in part dropped to the base plate and the remainder was easily brushed out. The assembly was then taken apart and examination of the tube showed no fluxing residues present on the refractory. The tube was placed in a kiln and fired at about 2500° F. for 10 hours.

Upon completion of the firing, the tube was examined and it was found that no cracking or other flaw could be detected. Moreover, examination of the bore showed it to be uniform over its entire length. In other words, it did not vary over its length beyond ⅛ inch from perfection.

Other structures have been made using the assembly and method wherein the batches included dead burned sea water magnesite and chrome ore. For example, very thin-walled tubes have been made in which the wall thickness was not materially greater than the diameter of the refractory materials used. The products obtained in all instances were surprisingly uniform and were considered far superior to those heretofore produced, based on the quality of the products and the ease and expense of production.

From the foregoing discussion, it is evident that the apparatus of the present invention comprises a valuable advance in the art of making refractory tubes, particularly large tubes. It is apparent that the advantages of the invention can be attained in the practice thereof in a manner other than as set forth in the specific example.

All percentages set forth are by weight unless otherwise indicated.

In accordance with the provisions of the patent statutes, the principle of the invention has been explained and there has been illustrated and described what is now believed to be its best embodiment. However, it should be understood that, within the scope of the attached claims, the invention can be practiced otherwise than as specifically illustrated and described.

What is claimed is:

1. An assembly for forming refractory tubes with an accurate bore comprising a pair of fluid absorbent, porous concentric tubes, means mounted at each end of said concentric tubes to maintain them in fixed spaced relation to one another, said tubes defining an annular space between their opposing surfaces, rigid means within the central tube of said pair and in contact therewith throughout substantially its entire length, rigid means disposed along the outer surface of the outer tube at circumferentially spaced intervals and in contact therewith throughout substantially its entire length, said pair of fluid absorbent, porous concentric tubes being composed of a material that withstands a temperature up to about 300° F. but chars away to a non-fused ash upon heating above about 300° F. but below its fluxing temperature, and closure means at one end of said annular space between said concentric tubes to retain therein refractory materials.

2. An assembly in accordance with claim 1 in which said pair of fluid absorbent porous concentric tubes are composed of cardboard.

References Cited in the file of this patent

UNITED STATES PATENTS

| | | |
|---|---|---|
| 114,905 | Barron | May 16, 1871 |
| 772,259 | Shell | Oct. 11, 1904 |
| 935,529 | Maag | Sept. 28, 1909 |
| 950,567 | Kesling | Mar. 1, 1910 |
| 1,225,182 | Schuettig | May 18, 1917 |
| 1,487,212 | Coburn | Mar. 18, 1924 |
| 2,129,680 | Durant | Sept. 13, 1938 |
| 2,296,018 | Boyle | Sept. 15, 1942 |
| 2,866,250 | Ford et al. | Dec. 30, 1958 |
| 2,870,515 | Parfitt | Jan. 27, 1959 |

FOREIGN PATENTS

| | | |
|---|---|---|
| 493,045 | Canada | May 19, 1953 |

UNITED STATES PATENT OFFICE
CERTIFICATE OF CORRECTION

Patent No. 3,123,886            March 10, 1964

Eldon D. Miller, Jr.

It is hereby certified that error appears in the above numbered patent requiring correction and that the said Letters Patent should read as corrected below.

Column 1, line 71, for "results" read -- result --; column 2, line 23, after "legs" insert -- 10 --; line 69, for "should" read -- could --.

Signed and sealed this 1st day of September 1964.

(SEAL)
Attest:

ERNEST W. SWIDER
Attesting Officer

EDWARD J. BRENNER
Commissioner of Patents